United States Patent
Miyamoto

(10) Patent No.: US 6,939,028 B2
(45) Date of Patent: Sep. 6, 2005

(54) REAR LIGHTING DEVICE FOR MOTORCYCLES

(75) Inventor: Takehiro Miyamoto, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 51 days.

(21) Appl. No.: 10/624,430

(22) Filed: Jul. 21, 2003

(65) Prior Publication Data

US 2004/0075543 A1 Apr. 22, 2004

(30) Foreign Application Priority Data

Sep. 4, 2002 (JP) ......................................... 2002-258377

(51) Int. Cl.[7] ................................................. B60J 6/04
(52) U.S. Cl. ........................ 362/473; 362/390; 362/543; 362/549
(58) Field of Search ................................. 362/369, 390, 362/473, 506, 540–543, 549; 340/432, 468, 470–47, 475

(56) References Cited

U.S. PATENT DOCUMENTS 5,713,653 A * 2/1998 White et al. ................. 362/473
6,053,626 A * 4/2000 Zagrodnik et al. .......... 362/473
6,120,167 A * 9/2000 Nace ........................... 362/473

FOREIGN PATENT DOCUMENTS

| JP | 53-89285 | | 7/1978 | |
| JP | 59073334 A | * | 4/1984 | ............ B60Q/1/30 |
| JP | 11-263257 | | 9/1999 | |

* cited by examiner

Primary Examiner—Alan Cariaso
(74) Attorney, Agent, or Firm—Hogan & Hartson, LLP

(57) ABSTRACT

A rear lighting device for a motorcycle is disclosed. The rear lighting device is mounted on a rear fender that covers a rear wheel of the motorcycle. The rear lighting device includes a flasher stay that is mounted on the rear fender through a stay bracket, and flashers mounted on right and left mounting end sections of the flasher stay. The flasher stay includes a mounting plane surface section provided in a generally central area of the flasher stay along its length direction and right and left end sections on both sides of the mounting plane surface section. The mounting plane surface section is defined by a plate like section that is generally flat in a direction perpendicular to the length direction of the flasher stay, and the mounting plane section extends generally horizontally as the flasher stay is mounted on the stay bracket.

22 Claims, 23 Drawing Sheets

REAR LIGHTING DEVICE FOR MOTORCYCLES

BACKGROUND OF THE INVENTION

1. Field of the Invention

The present invention relates to rear lighting devices for vehicles such as motorcycles.

2. Related Background Art

A motorcycle may be equipped with a tail lamp mounted on a rear fender that covers a rear wheel. A plurality of light emitting elements may be used in the tail lamp.

Also, a motorcycle may be equipped with flashers mounted on both right and left ends of flasher stays that are made up of round pipes, and the flasher stays are mounted on a rear fender by a holder.

When the flasher stays made up of round pipes are used, a mounting state in which the flasher stays are mounted on the rear fender needs to be hidden from view by the holder which is an independent part. This results in a greater number of parts, and a more complicated mounting structure.

The use of a plurality of light emitting elements for the tail lamp may entail some problems. For example, the tail lamp cannot illuminate a license plate like a rear lighting device that uses light bulbs, and an independent license lamp may be required to illuminate the license plate. Also, the mounting section of the license plate may not have the good appearance.

SUMMARY OF THE INVENTION

The present invention has been made in view of the problems described above, and relates to a rear lighting device for a motorcycle, which reduces the number of parts, has a relatively simple mounting structure, and have the good appearance.

In accordance with an embodiment of the present invention, a rear lighting device for a motorcycle mounted on a rear fender that covers the rear wheel, the rear lighting device includes a flasher stay that is mounted on the rear fender through a stay bracket, and flashers mounted on right and left mounting end sections of the flasher stay, wherein the flasher stay includes a mounting plane surface section provided in a generally central area of the flasher stay along its length direction and right and left end sections on both sides of the mounting plane surface section. In one aspect, the mounting plane surface section may be defined by a plate like section that is generally flat in a direction perpendicular to the length direction of the flasher stay, and the flasher stay is mounted on the stay bracket in a manner that the mounting plane section extends generally horizontally.

In another aspect, the flasher stay may be made of a generally round pipe, and a central area of the round pipe may be pressed flat to form the mounting plane surface section while leaving both ends of the round pipe uncompressed. As a result, the right and left end sections of the flasher stay are formed from round pipe-like end sections.

Due to the fact that the flasher stay is mounted on the stay bracket in a manner that the mounting plane section in the central area of the flasher stay extends horizontally, the flasher stay itself can cover the stay bracket, which provides a better appearance. In addition, a separate member is not required to cover the mounting section, and the number of parts can be reduced.

In one aspect of the present embodiment, the flasher stay bends such that the mounting plane section is positioned higher than the end sections. In one aspect, the flasher stay bends such that the right and left end sections of the flasher stay are displaced lower than the mounting plane section when the flasher stay is mounted on the stay bracket.

Due to the fact that the flasher stay bends such that the mounting plane section is placed higher than the right and left ends sections of the flasher stay when the flasher stay is mounted on the stay bracket, the flasher stay itself can cover the stay bracket from above, which makes the mounting section of the flasher stay look nicer. In addition, a separate member to cover the stay bracket is not required, and therefore the number of parts can be reduced.

In one aspect of the present embodiment, a license lamp may be mounted on the mounting plane section of the flasher stay.

Due to the fact that the license lamp is mounted on the mounting plane section of the flasher stay, the license lamp can be readily and securely mounted on the flasher stay, and the license lamp may be difficult to be seen from outside.

In another aspect of the present invention, the license lamp may be mounted on a lower side of the mounting plane section.

Due to the fact that the license lamp is mounted on the lower side of the mounting plane section of the flasher stay, the flasher stay itself can cover the license lamp, which makes it difficult to see the license lamp from outside.

In one aspect of the present embodiment, the rear lighting device may be equipped with a tail lamp having a plurality of light emitting elements that is independent of the license lamp.

As a result, the mounting structure of the rear lighting device can be simplified due to the independently provided license lamp and the tail lamp.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

A rear lighting device for a motorcycle in accordance with an embodiment of the present invention will be described below with reference to the accompanying drawings.

Figure 1:
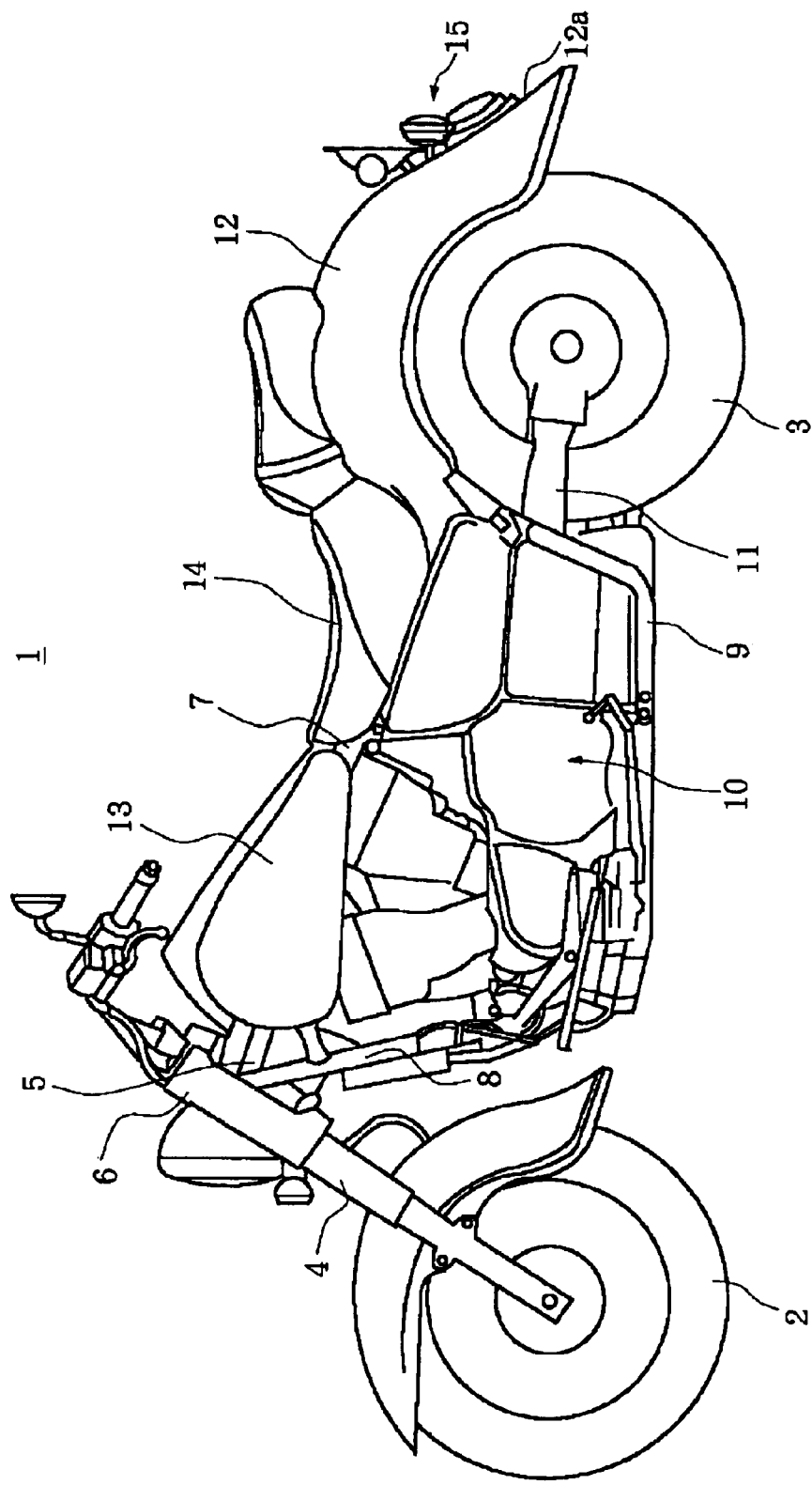
FIG. 1 is a side view of a motorcycle.
Figure 2:
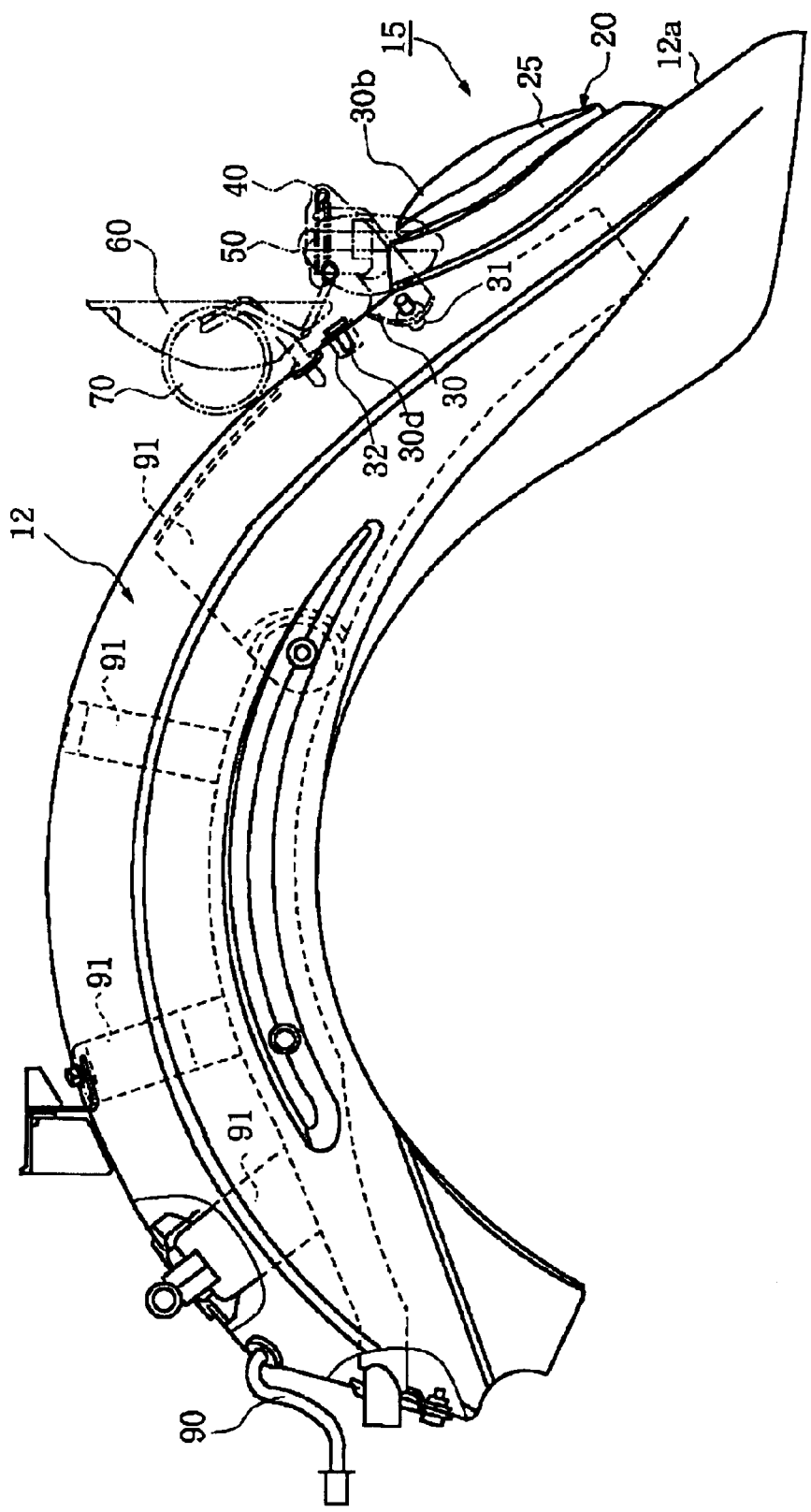
FIG. 2 is a side view of a rear fender with a tail lamp mounted thereon.
Figure 3:
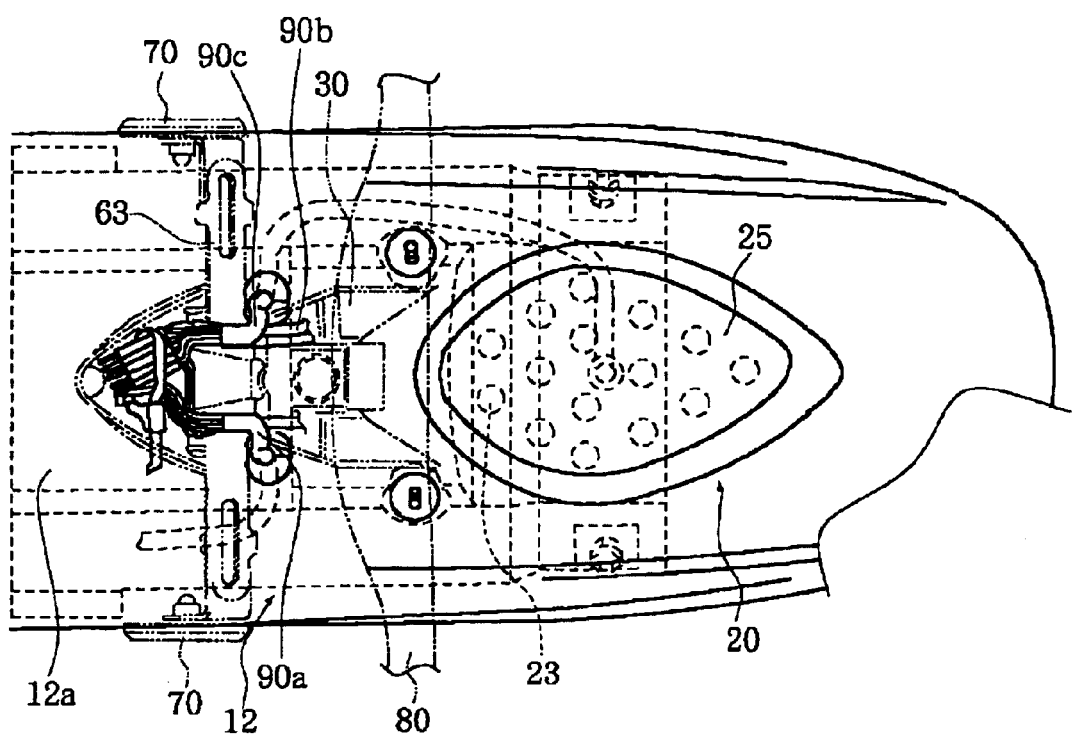
FIG. 3 is a plan view of the rear fender without a tail lamp.
Figure 4:
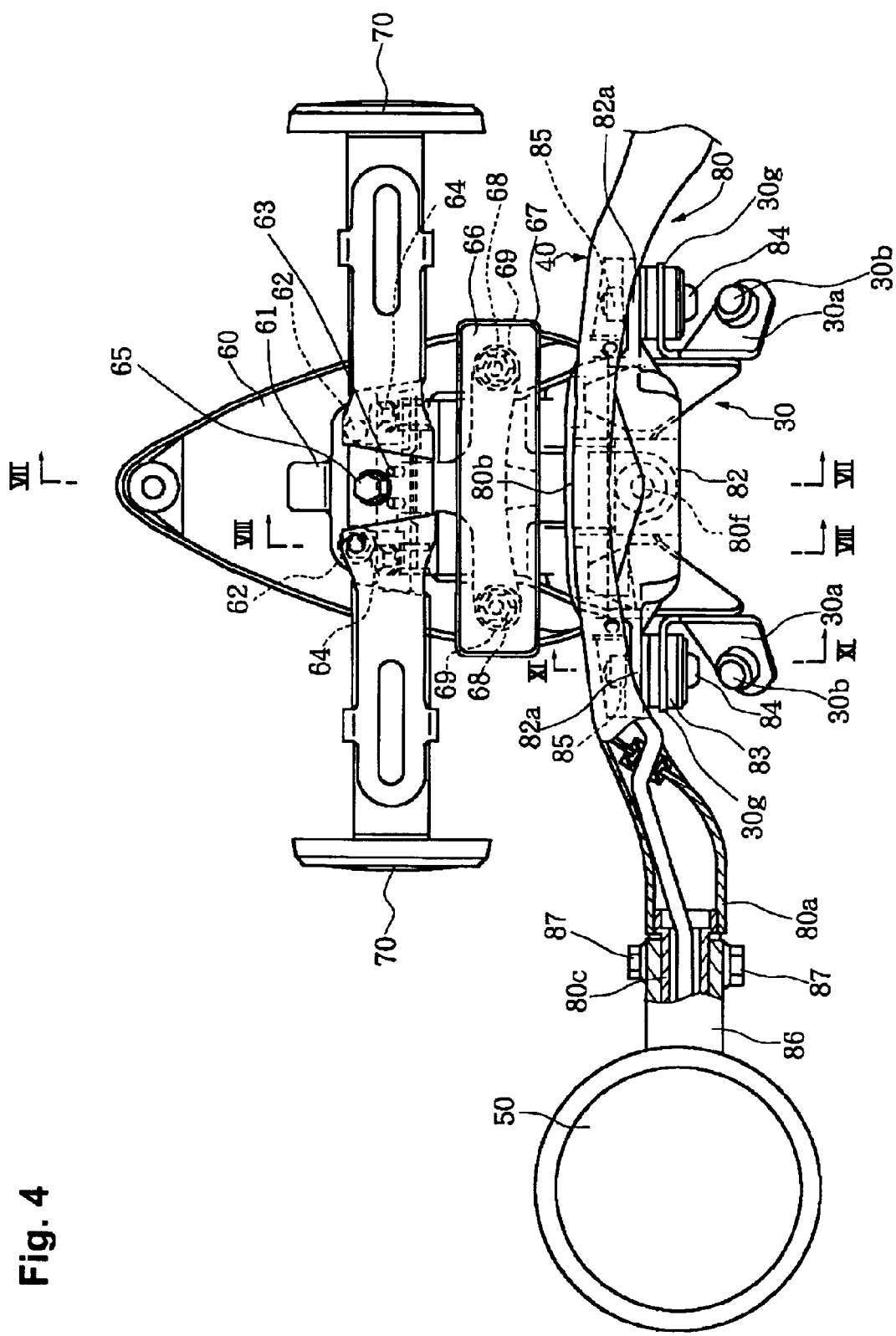
FIG. 4 is a rear view of a rear lighting device in accordance with an embodiment of the present invention.
Figure 5:
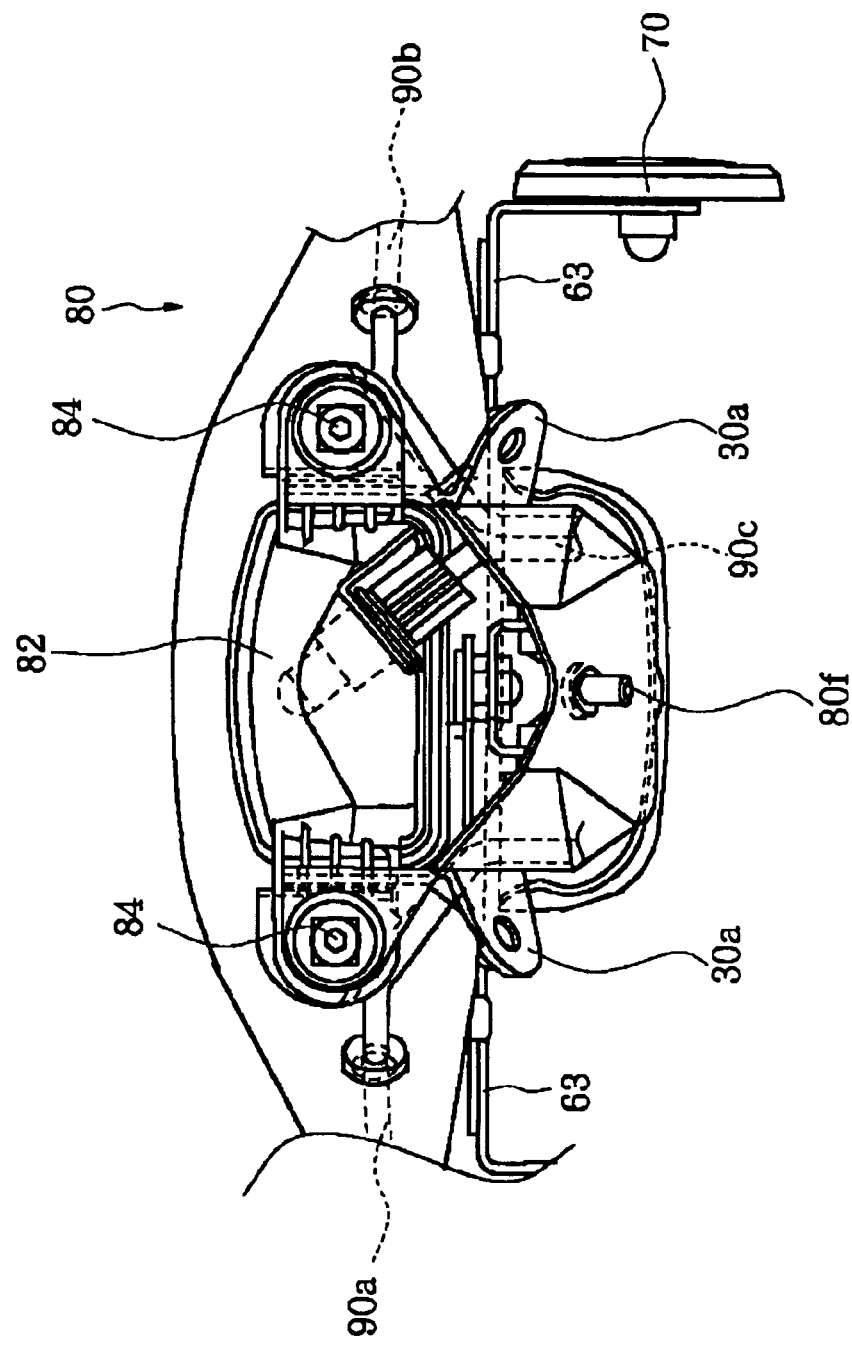
FIG. 5 is a bottom view of the rear lighting device.
Figure 6:
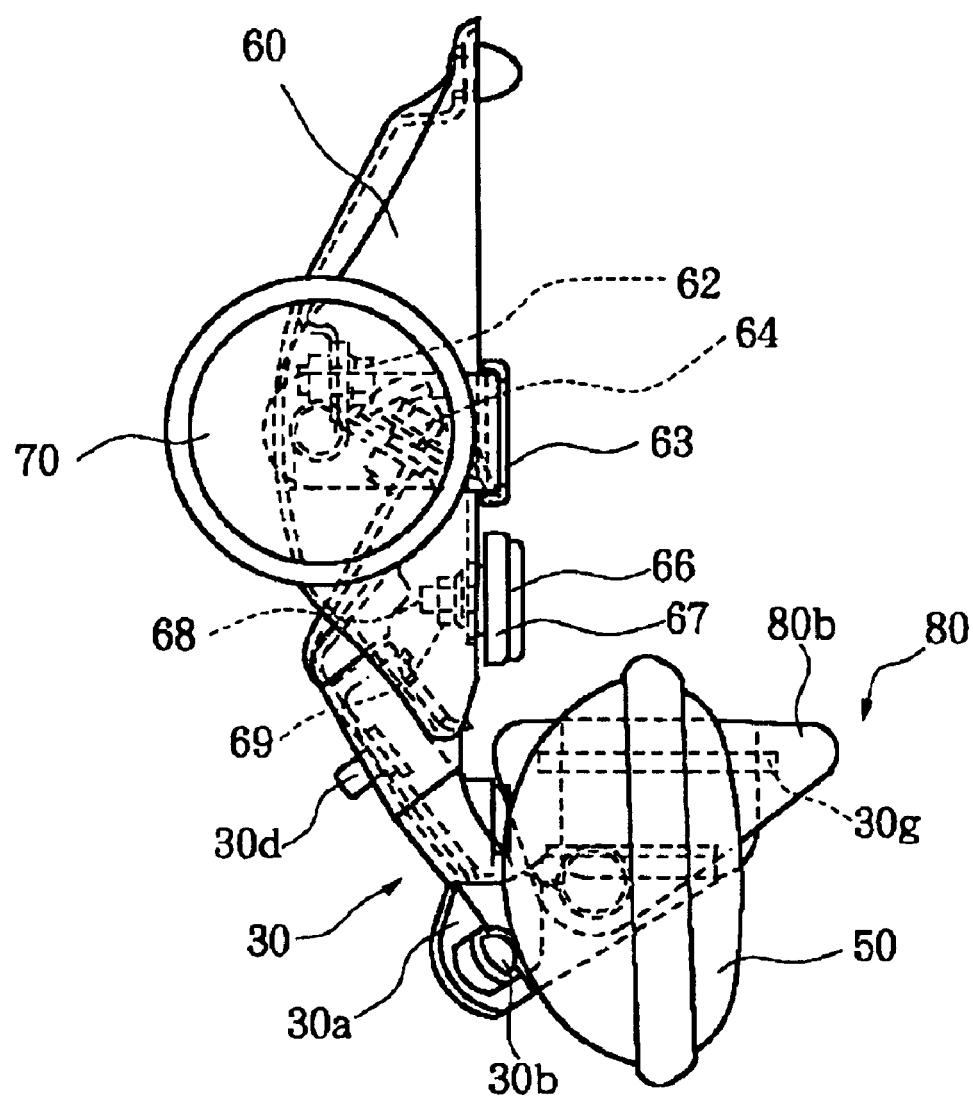
FIG. 6 is a side view of the rear lighting device.
Figure 7:
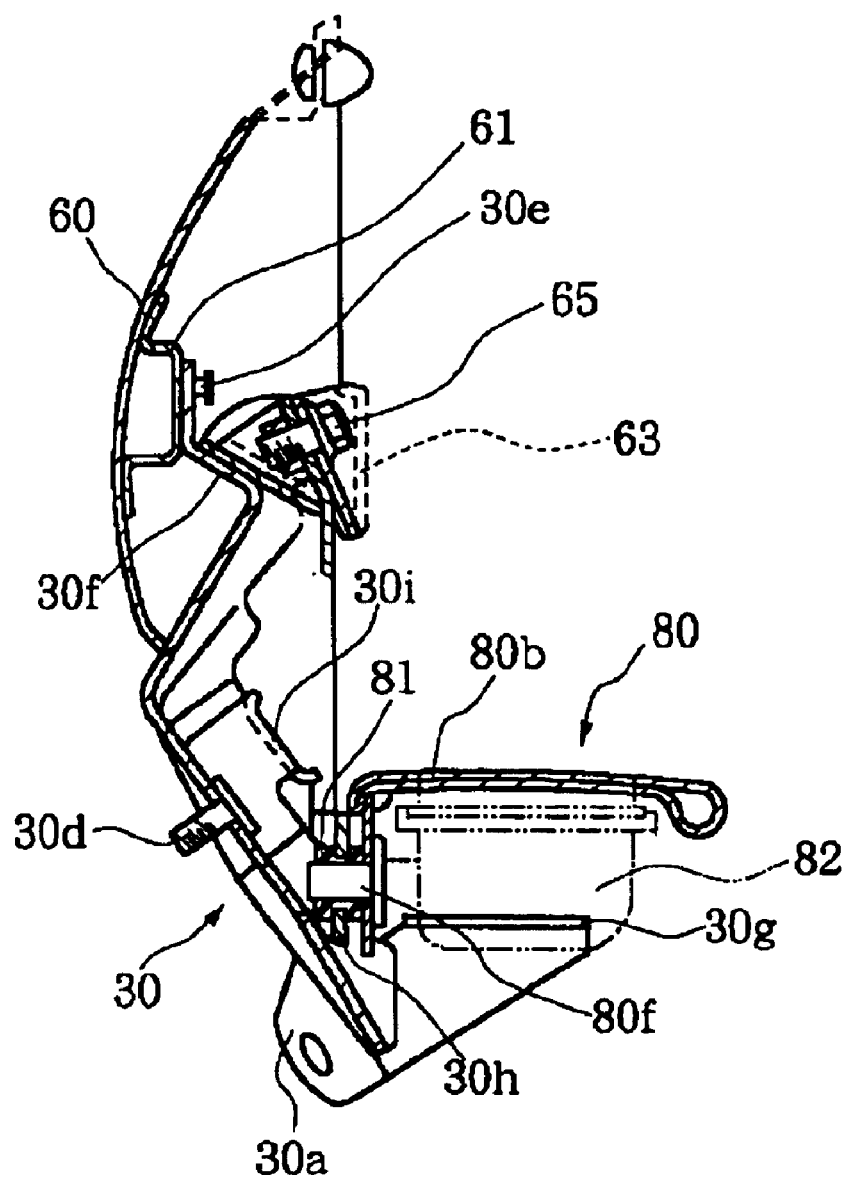
FIG. 7 is a cross-sectional view taken along lines VII—VII of FIG. 4.
Figure 8:
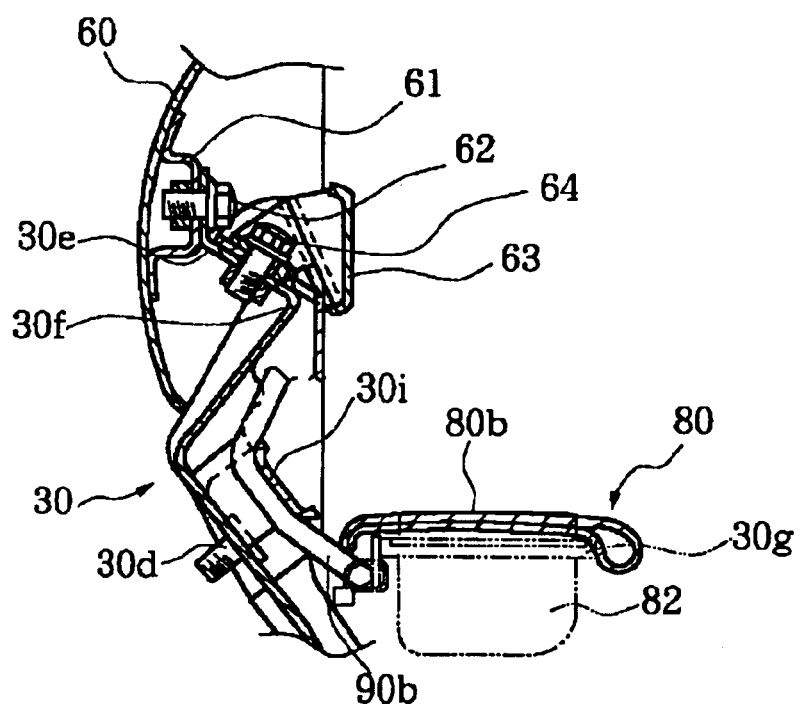
FIG. 8 is a cross-sectional view taken along lines VIII—VIII of FIG. 4.
Figure 9:
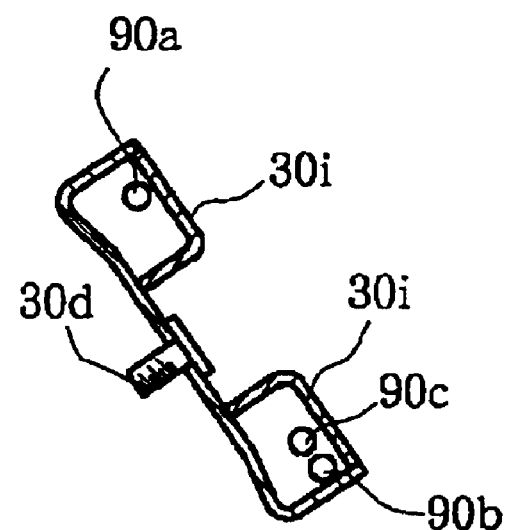
FIG. 9 is a cross-sectional view taken along lines IX—IX of FIG. 6.
Figure 10:
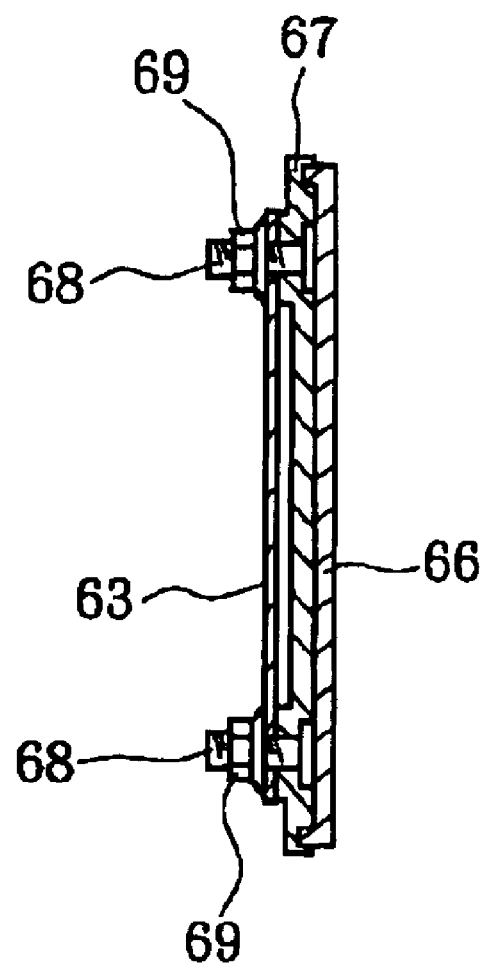
FIG. 10 is a cross-sectional view taken along lines X—X of FIG. 6.
Figure 11:
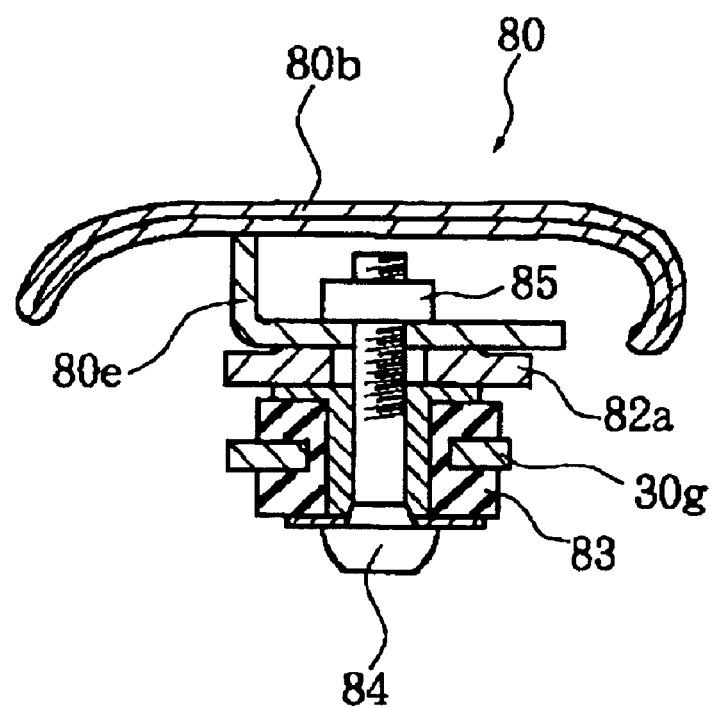
FIG. 11 is a cross-sectional view taken along lines XI—XI of FIG. 4.
Figure 12:
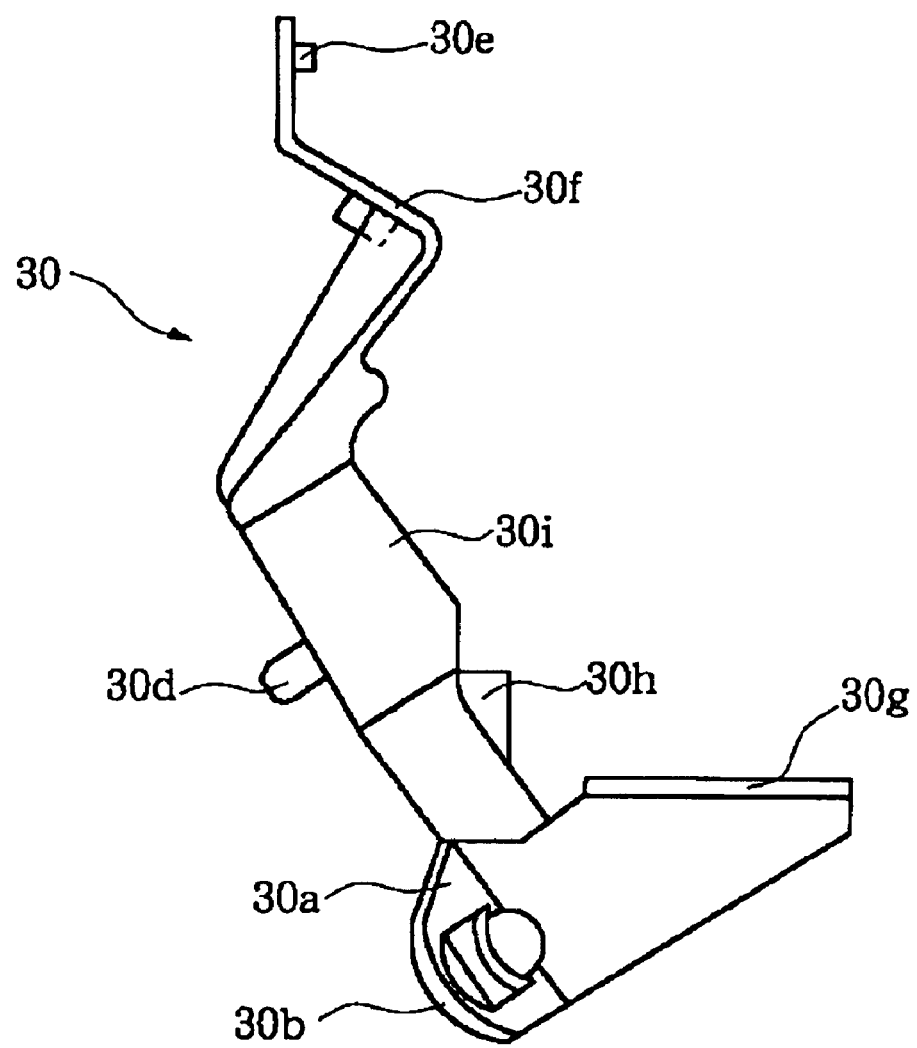
FIG. 12 is a side view of a stay bracket.
Figure 13:
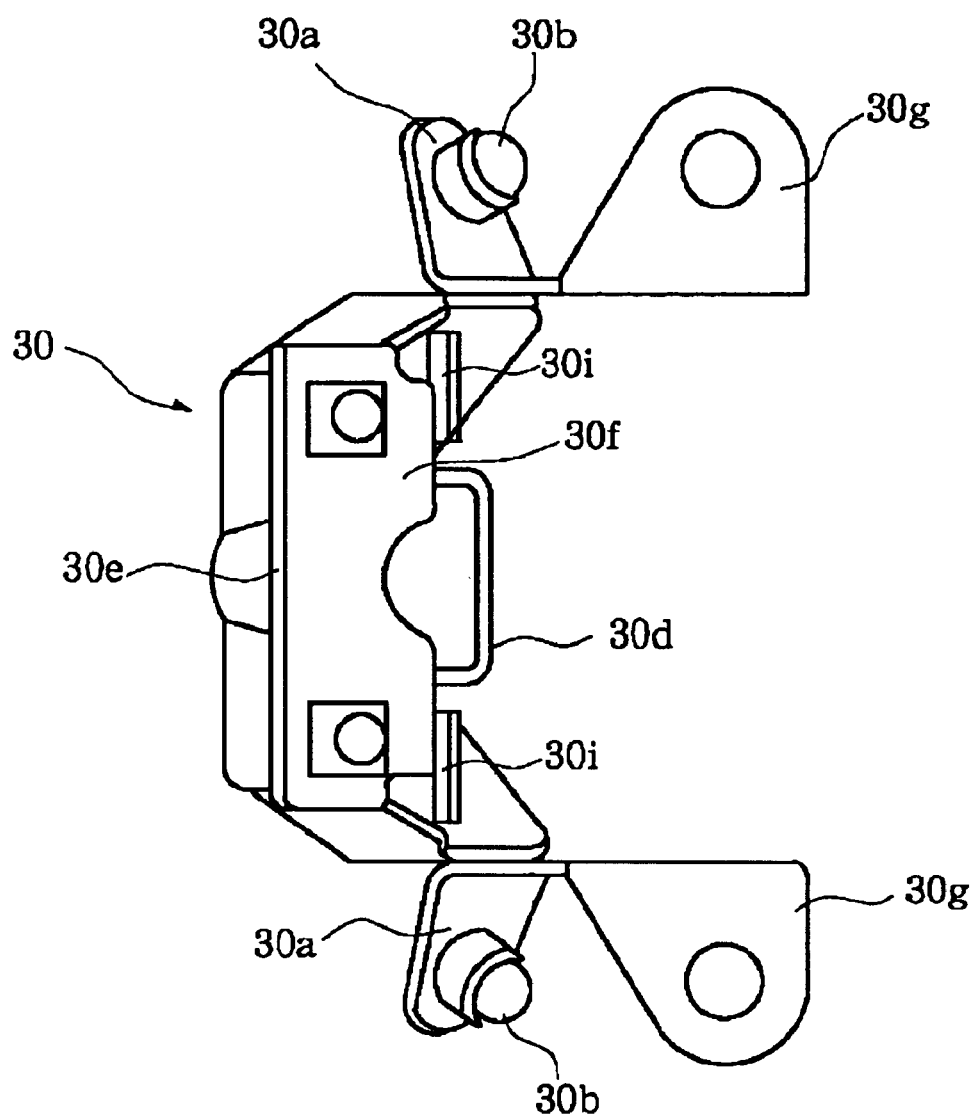
FIG. 13 is a plan view of the stay bracket.
Figure 14:
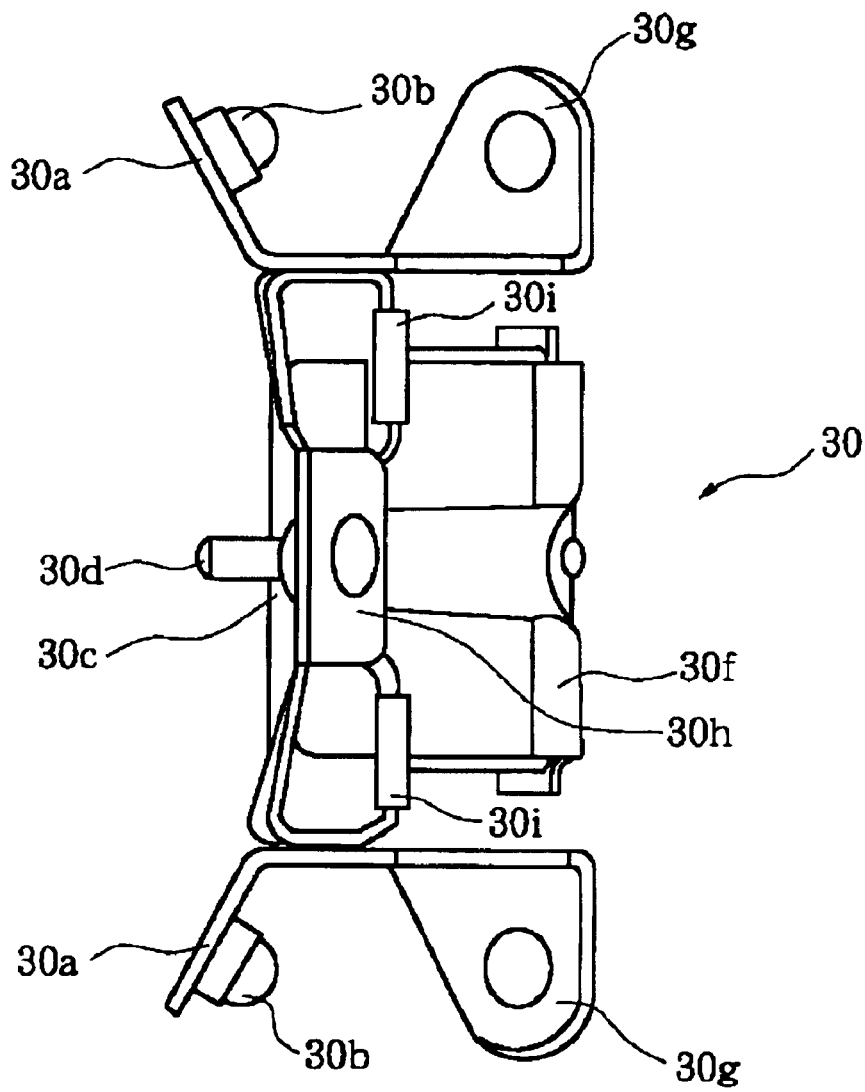
FIG. 14 is a view seen from a direction A in FIG. 12.
Figure 15:
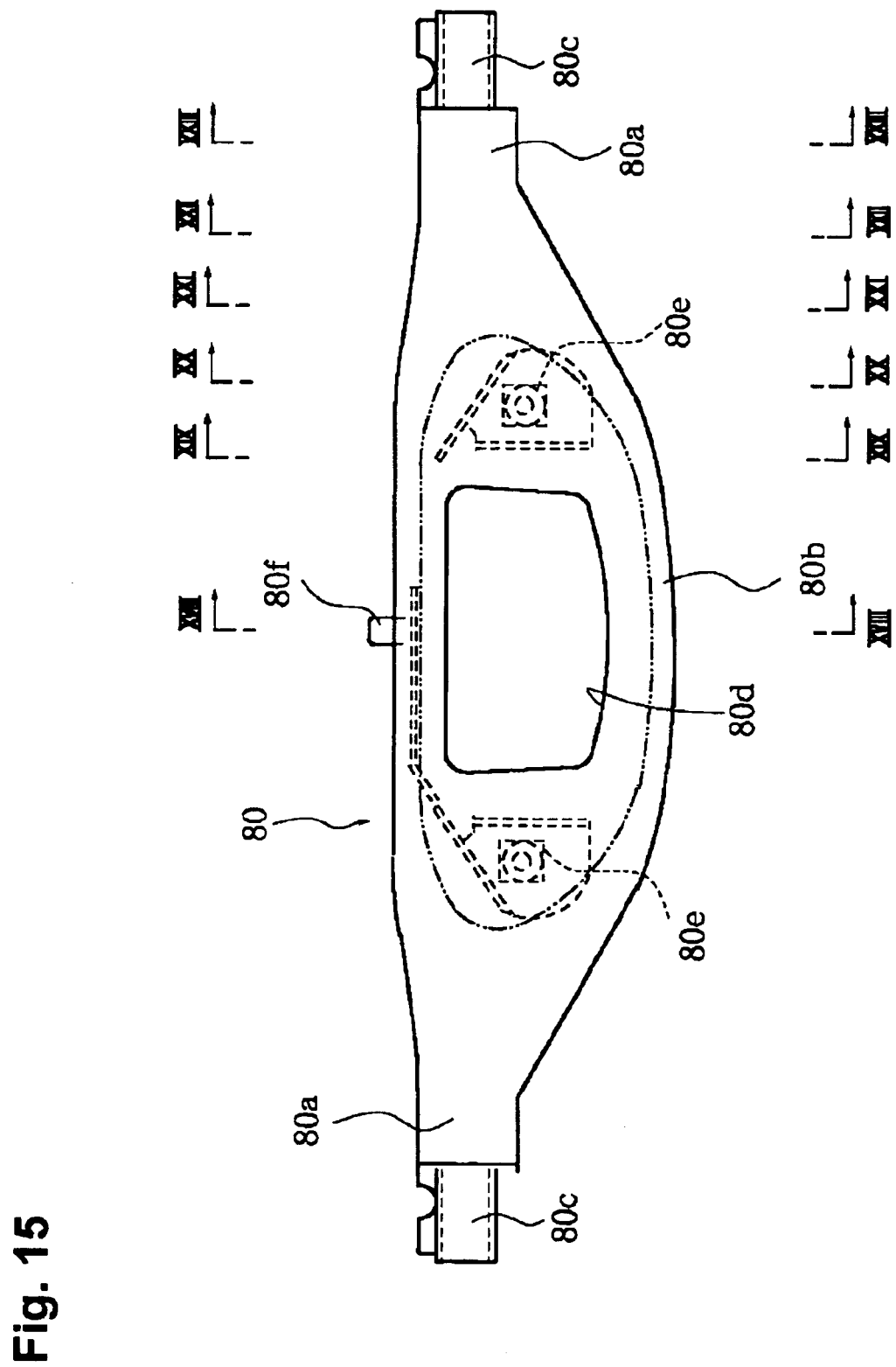
FIG. 15 is a plan view of a flasher stay.
Figure 16:
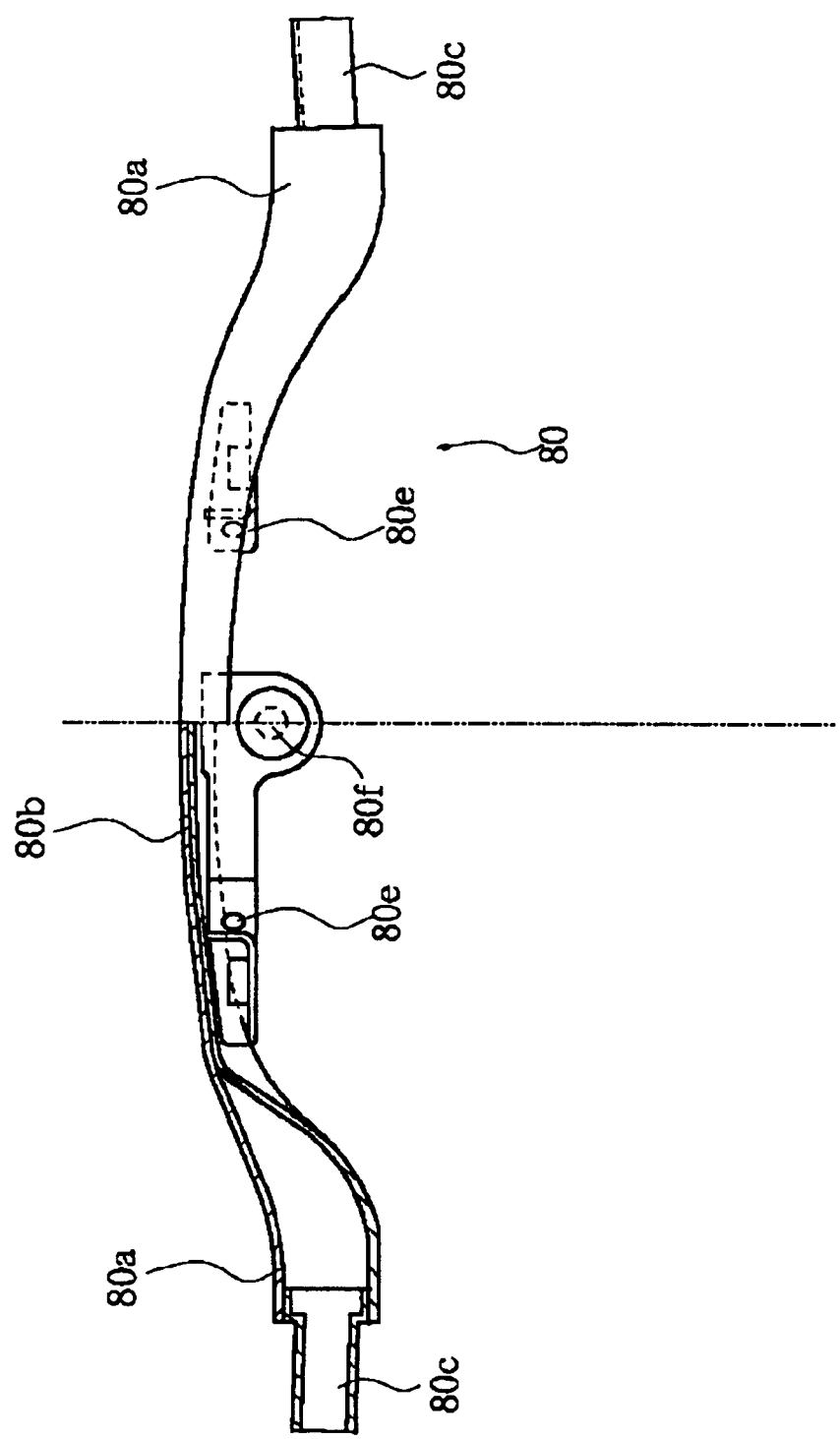
FIG. 16 is a rear view of the flasher stay with a partially cross-sectional view thereof.
Figure 17:
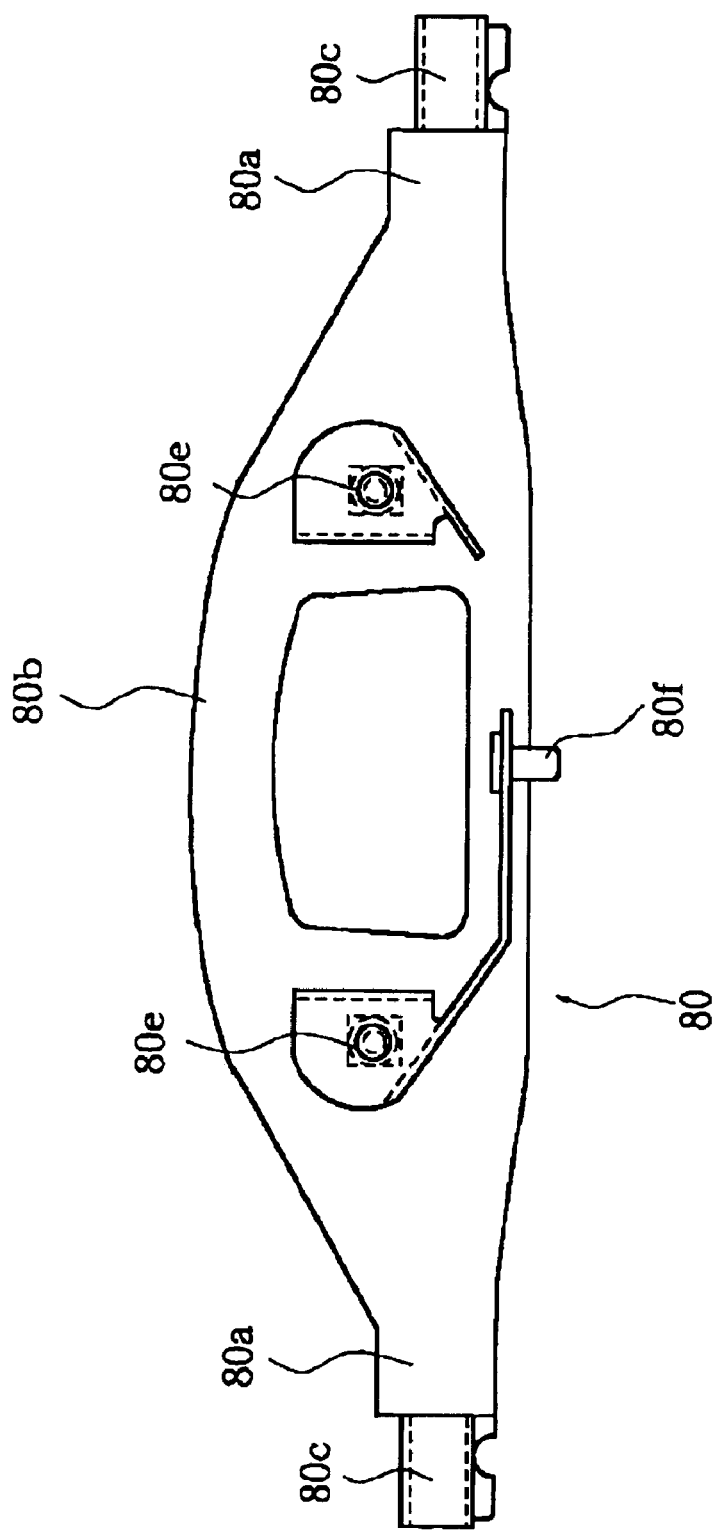
FIG. 17 is a bottom view of the flasher stay.
Figure 18:
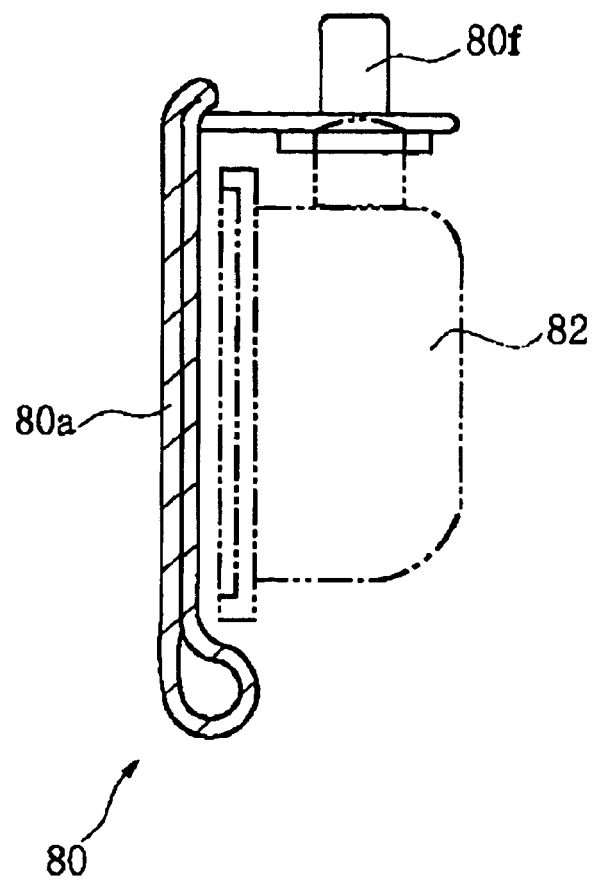
FIG. 18 is a cross-sectional view taken along lines XVIII—XVIII of FIG. 15.
Figure 19:
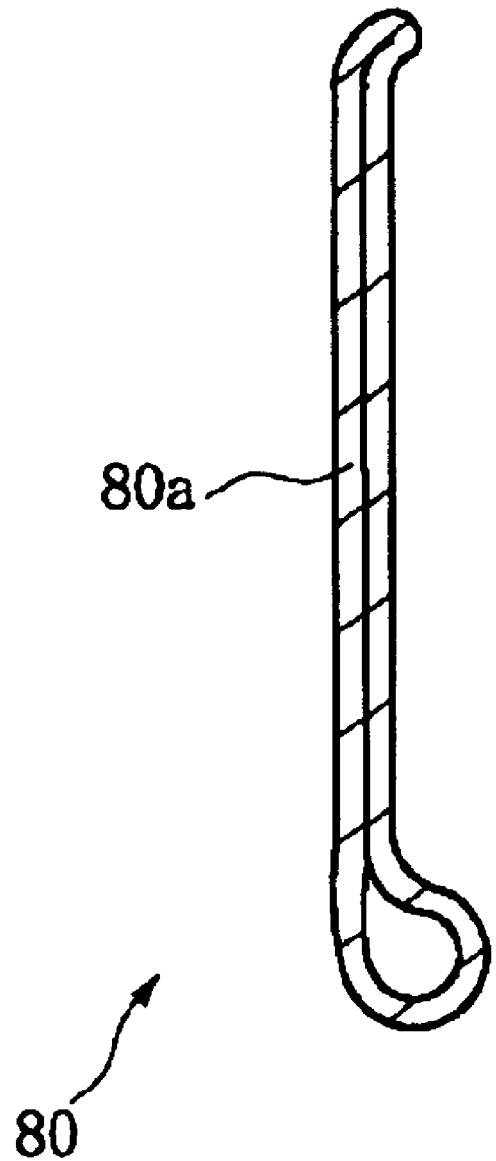
FIG. 19 is a cross-sectional view taken along lines XIX—XIX of FIG. 15.
Figure 20:
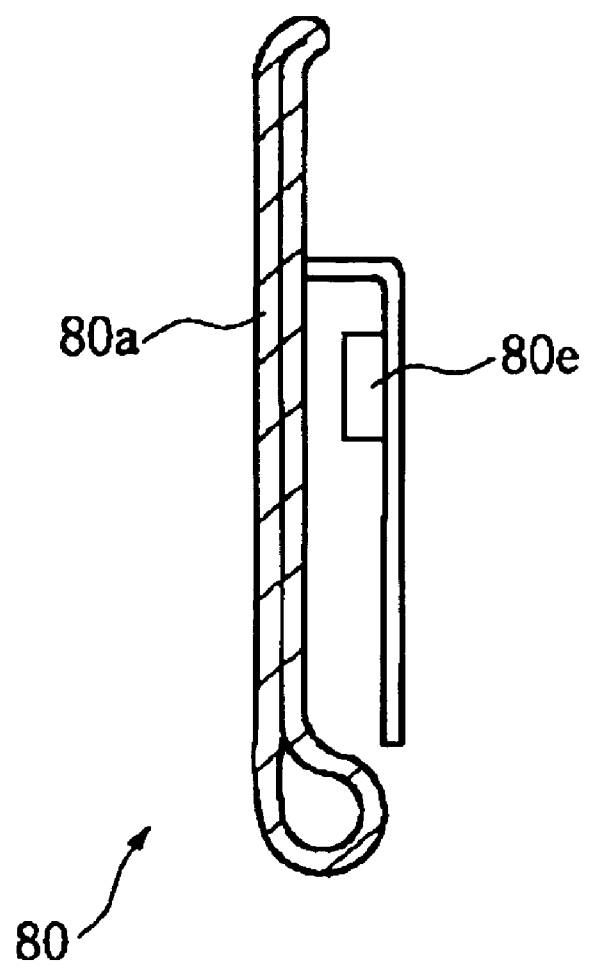
FIG. 20 is a cross-sectional view taken along lines XX—XX of FIG. 15.
Figure 21:
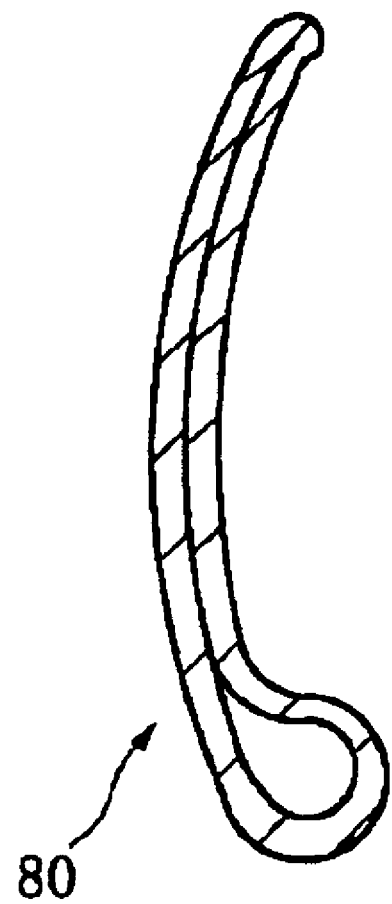
FIG. 21 is a cross-sectional view taken along lines XXI—XXI of FIG. 15.
Figure 22:
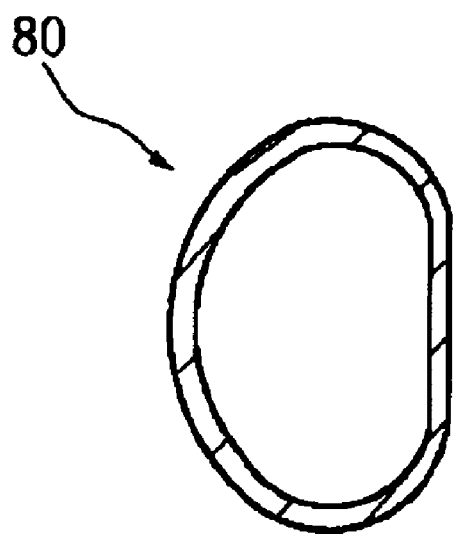
FIG. 22 is a cross-sectional view taken along lines XXII—XXII of FIG. 15.
Figure 23:
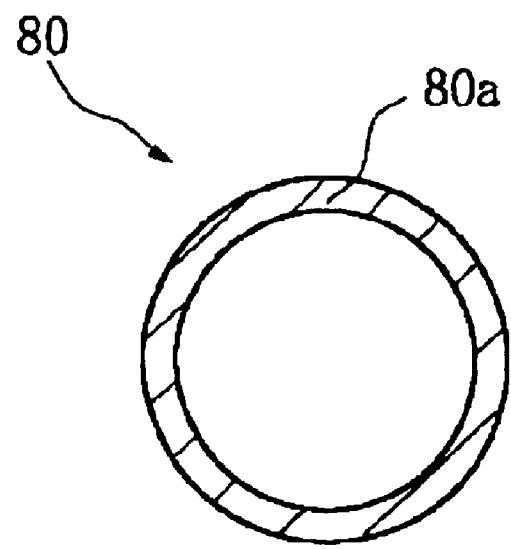
FIG. 23 is a cross-sectional view taken along lines XXIII—XXIII of FIG. 15.

FIG. 1 is a side view of a motorcycle. FIG. 2 is a side view of a rear fender with a tail lamp mounted thereon. FIG. 3 is a plan view of the rear fender without a tail lamp. FIG. 4 is a rear view of a rear lighting device in accordance with an embodiment of the present invention. FIG. 5 is a bottom view of the rear lighting device. FIG. 6 is a side view of the rear lighting device. FIG. 7 is a cross-sectional view taken along lines VII—VII of FIG. 4. FIG. 8 is a cross-sectional view taken along lines VIII—VIII of FIG. 4. FIG. 9 is a cross-sectional view taken along lines IX—IX of FIG. 6. FIG. 10 is a cross-sectional view taken along lines X—X of FIG. 6. FIG. 11 is a cross-sectional view taken along lines XI—XI of FIG. 4. FIG. 12 is a side view of a stay bracket. FIG. 13 is a plan view of the stay bracket. FIG. 14 is a view seen from a direction A in FIG. 12. FIG. 15 is a plan view of a flasher stay. FIG. 16 is a rear view of the flasher stay with a partially cross-sectional view thereof. FIG. 17 is a bottom view of the flasher stay. FIG. 18 is a cross-sectional view taken along lines XVIII—XVIII of FIG. 15. FIG. 19 is a cross-sectional view taken along lines XIX—XIX of FIG. 15. FIG. 20 is a cross-sectional view taken along lines XX—XX of FIG. 15. FIG. 21 is a cross-sectional view taken along lines XXI—XXI of FIG. 15. FIG. 22 is a cross-sectional view taken along lines XXII—XXII of FIG. 15. FIG. 23 is a cross-sectional view taken along lines XXIII—XXIII of FIG. 15.

A motorcycle 1 of the present embodiment may be an American type, which has a longer wheel base between a front wheel 2 and a rear wheel 3 compared to a road racer type. In the motorcycle 1, a front folk 4 that rotatably supports the front wheel 2 is supported in a manner swingable by a steering head 6 of a vehicle frame 5.

The vehicle frame 5 is generally composed of the steering head 6, a tank rail 7, a down tube 8 and a rear arm bracket 9; and an engine 10 is mounted on the vehicle frame 5.

The rear arm bracket 9 shaft-supports a rear arm 11, and the rear arm 11 shaft-supports the rear wheel 3. A rear fender 12 that covers over the upper portion of the rear wheel 3 is mounted on the rear arm bracket 9. Also, a fuel tank 13 is mounted on the tank rail 7 above the engine 10, and a two-step sheet 14 is provided in the rear of the fuel tank 13, extending from a front section to a rear upper section of the rear arm 11.

The rear fender 12 generally overlaps, as viewed from the side in a side view in FIG. 1, a circumferential section in a generally upper half section of the rear wheel 3, and its overall configuration is generally arcuate. The rear fender 12 includes a rear descending face 12a that faces upward, and has a sloped, rearwardly descending and generally plane surface. A rear lighting device 15 is mounted on the rear descending face 12a.

The rear lighting device 15 includes a tail lamp 20. The tail lamp 20 includes light emitting elements 23 and a lens 25 over the light emitting elements 23. The light emitting elements 23 may be composed of LED light emitting elements, which do not burn out like light bulbs.

A flasher stay 80 that extends laterally (right and left directions with respect to the extending direction of the wheel base) is mounted on the rear fender 12 through a stay bracket 30. Flashers 50 are mounted on right and left end mounting sections of the flasher stay 80.

The stay bracket 30, as shown in FIGS. 10 through 12, has arm sections 30a on right and left sides thereof, and nut sections 30b provided at the arm sections 30a, respectively. A central section 30c of the stay bracket 30 is provided with a bolt section 30d. Bolts 31 (see FIG. 2) are screwed in the nut sections 30b from the rear side of the rear fender 12, and a nut 32 is screwed on the bolt section 30d to affix the stay bracket 30 to the rear fender 12.

Also, the stay bracket 30 includes a reflector mounting section 30e, a reflector stay mounting section 30f and flasher stay mounting sections 30g and 30h. A bracket 61 of a reflector 60 is screw-fastened to the reflector mounting section 30e with a bolt 62. A license bracket 63 is screw-fastened to the reflector mounting section 30f with bolts 64 and 65.

A license plate 66 is attached to the license bracket 63 through a holder 67, a bolt 68 and a nut 69. The license bracket 63 includes stay sections extending laterally with respect to the length direction of the wheel base. Reflectors 70 are attached to the stay sections of the license bracket 63.

The flasher stay 80 that extends laterally is mounted on the flasher stay mounting sections 30g and 30h. The flasher stay 80 can be made of any appropriate material. For example, as shown in FIGS. 15 through 23, a generally round metal pipe having a specified length may be pressed generally flat in its central area to form a generally flat mounting plane section 80b while leaving right and left end sections 80a uncompressed. The pipe may be bent such that the mounting plane section 80b is located higher than the right and left end sections 80a. The mounting plane section 80b may be curved in a shallow arc shape as viewed from rear of the motorcycle such that the right and left end sections 80a of the flasher stay 80 are positioned lower than the mounting plane section 80b as viewed from rear.

Flasher mounting sections 80c are joined to the right and left end section 80 such that the flasher mounting sections 80c are located lower than the mounting plane section 80b as viewed from the side.

An opening section 80d is formed in the mounting plane section 80b, and mounting brackets 80e are provided on both right and left sides of the opening section 80d on the lower side of the mounting plane section 80b. Also, a mounting pin 80f is mounted on the front side of the mounting plane section 80b.

The flasher stay 80 is mounted as follows. The mounting pin 80f of the flasher stay 80 is fitted in a grommet 81 provided in the flasher stay mounting section 30h as shown in FIG. 7, and the mounting brackets 80e are screw-fastened together with lamp mounting sections 82a of a license lamp 82 to gaskets 83 mounted on the flasher stay mounting sections 30g, using bolts 84 and nuts 85, as shown in FIG. 11.

As shown in FIG. 4, dampers 86 of the flashers 50 are connected to the mounting sections 80c of the right and left end sections 80 of the flasher stay 80 bit bolts 87. As described above, the flasher stay 80 is made of a generally round metal pipe which is pressed generally flat in its central area to form the generally flat mounting plane section 80b that is generally flat in the length direction of the wheel base (i.e., a front-to-rear direction) while leaving the right and left end sections 80a of the pipe uncompressed. The flasher stay 80 is mounted on the stay bracket 30 in a manner that the mounting plane section 80 extends generally horizontally. Also, when the flasher stay 80 is mounted on the stay bracket 30, the mounting plane section 80b is located higher than the right and left end sections 80a which are bent downward. As a result, the flasher stay 80 itself can cover the stay bracket 30 from above, which provides the good appearance, does not require a separate member to cover the stay bracket 30, and reduces the number of parts.

Also, the license lamp 82 is mounted in a manner to face the opening section 80d of the mounting plane section 80b of the flasher stay 80, such that the light emitted from the license lamp 82 illuminates the license plate 66 through the opening section 80d.

A wire harness 90 of electrical power lines and signal lines is passed through the space between the inner side of the rear fender 12 and fender stays 91, as shown in FIGS. 2 and 3, and lead out from the inner side to the outer side of the rear fender 12. Then, as shown in FIGS. 5 and 9, the lines pass through right and left holder sections 30i of the stay bracket 30, and retained by the holder sections 30i so as not to interfere with other members. In the embodiment, a line 90a for the right-side flasher 50 passes the right-side holder section 30i of the stay bracket 30, and a line 90b for the left-side flasher 50 and a line 90c for the license lamp 82 pass the left-side holder section 30i of the stay bracket 30; and the lines are connected to the right and left flashers 50 and the license lamp 82, respectively.

In the present embodiment, the tail lamp 20 is equipped with a plurality of light emitting elements 23, and it is therefore difficult for the tail lamp 20 to illuminate the license plate 66. Accordingly, the license lamp 82 to illuminate the license plate 66 is provided independently of the tail lamp 20. The license lamp 82 is attached to the mounting plane section 80b of the flasher stay 80. By so doing, the license lamp 82 can be readily and securely mounted on the motorcycle, and cannot be readily viewed from outside.

Also, the license lamp 82 is attached to the lower side of the mounting plane section 80b of the flasher stay 80. As a result, the flasher stay 80 itself covers the license lamp 82, which makes it difficult for the license lamp 82 to be viewed from outside. As a result, the mounting structure of a rear lighting device equipped with the tail lamp 20 provided independently of the license lamp 82 can be simplified.

As described above, the flasher stay is made up of a generally round pipe, and a central area of the round pipe may be pressed to form a mounting plane surface section, and the flasher stay is mounted on the stay bracket in a manner that the mounting plane section in the central area of the flasher stay extends horizontally. As a result, the flasher stay itself can cover the stay bracket from above, which provides the good appearance. In addition, a separate member is not required to cover the mounting section, and therefore the number of parts can be reduced.

The flasher stay bends such that the mounting plane section is positioned higher than the right and left end sections of the flasher stay, and the right and left end sections of the flasher stay are displaced lower than the mounting plane section when the flasher stay is mounted on the stay bracket. As a result, the flasher stay itself can cover the stay bracket from above, which provides the good appearance, makes a separate member to cover the stay bracket unnecessary, and reduces the number of parts.

Moreover, because the license lamp is mounted on the mounting plane section of the flasher stay, the license lamp can be readily and securely mounted on the motorcycle, and the license lamp is difficult to be seen from outside.

Also, because the license lamp is mounted on the lower side of the mounting plane section of the flasher stay, the flasher stay itself can cover the license lamp, which makes it difficult to see the license lamp from outside.

Furthermore, because the tail lamp is provided independently of the license lamp, the mounting structure of the rear lighting device can be simplified.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rear lighting device for a motorcycle mounted on a rear fender that covers a rear wheel, the rear lighting device comprising:

a metal stay bracket attached to the rear fender;

a metal flasher stay that is mounted on the metal stay bracket through a gasket, the metal flasher stay including a mounting plane surface section in a generally central area thereof along a length direction thereof, and right and left end sections on both sides of the mounting plane surface section, wherein the mounting plane surface section extends generally horizontally; and flashers are mounted at the right and left end sections of the flasher stay.

2. A rear lighting device according to claim 1, wherein the mounting plane surface section defines a plate-like section that is generally flat in a direction perpendicular to the length direction of the flasher stay, and the mounting plane section extends horizontally when the flasher stay is mounted on the stay bracket that is fixed to the rear fender.

3. A rear lighting device according to claim 1, wherein the mounting plane surface section is wider than the right and left end sections in a width direction perpendicular to the length direction of the flasher stay.

4. A rear lighting device according to claim 1, wherein each of the right and left end sections of the flasher stay is generally round.

5. A rear lighting device according to claim 1, wherein the flasher stay is made of a generally round metal pipe, and a central area of the round metal pipe is pressed to define the mounting plane surface section and both ends of the round metal pipe are left uncompressed to define the right and left end sections of the flasher stay.

6. A rear lighting device according to claim 1, wherein the flasher stay bends such that the mounting plane section is positioned higher than the right and left end sections as the flasher stay is mounted on the stay bracket.

7. A rear lighting device according to claim 1, wherein the flasher stay bends such that the right and left end sections of the flasher stay are displaced lower than the mounting plane section as the flasher stay is mounted on the stay bracket.

8. A rear lighting device according to claim 6, wherein the flasher stay covers the stay bracket from above.

9. A rear lighting device according to claim 6, further comprising a license lamp that is mounted on the mounting plane section of the flasher stay.

10. A rear lighting device according to claim 6, wherein the license lamp is mounted on a lower side of the mounting plane section of the flasher stay.

11. A rear lighting device according to claim 10, wherein the mounting plane section of the flasher stay has an opening section and the license lamp emits light upward through the opening section of the flasher stay.

12. A rear lighting device according to claim 9, further comprising a tail lamp that is independent of the license lamp.

13. A rear lighting device according to claim 12, wherein the tail lamp comprise a plurality of light emitting elements.

14. A rear lighting device for a vehicle mounted on a rear fender of the vehicle, the rear lighting device comprising:
- a generally horizontal surface section formed on a metal stay bracket attached to the rear fender;
- a metal flasher stay that is mounted on the generally horizontal surface section through a gasket, the flasher stay including a central plane area and end sections on both sides of the central plane area, wherein the central plane area of the flasher stay extends generally horizontally as the flasher stay is mounted on the generally horizontal surface section.

15. A rear lighting device according to claim 14, wherein the central plane area of the flasher stay is wider than the end sections thereof in a longitudinal direction generally perpendicular to a lengthwise direction of the flasher stay.

16. A rear lighting device according to claim 14, wherein the central plane area of the flasher stay defines a generally flat surface extending in a longitudinal direction perpendicular to a lengthwise direction of the flasher stay, and the central plane area extends horizontally as the flasher stay is mounted on the generally horizontal surface section.

17. A rear lighting device according to claim 14, wherein the mounting plane section is curved in a shallow arc shape as viewed from rear of the motorcycle such that the end sections of the flasher stay are positioned lower than the mounting plane section as viewed from rear.

18. A rear lighting device according to claim 14, wherein the flasher stay is made of a generally round metal pipe, and a central area of the round metal pipe is pressed to define the mounting plane surface section and both ends of the round metal pipe are left uncompressed to define the end sections of the flasher stay.

19. A rear lighting device according to claim 14, further comprising a license lamp that is mounted on the mounting plane section of the flasher stay.

20. A rear lighting device according to claim 19, wherein the license lamp is mounted on a lower side of the mounting plane section of the flasher stay.

21. A rear lighting device according to claim 20, wherein the mounting plane section of the flasher stay has an opening section and the license lamp emits light upward through the opening section of the flasher stay.

22. A rear lighting device according to claim 19, further comprising a tail lamp composed of a plurality of light emitting elements, the tail lamp being independent of the license lamp.

\* \* \* \* \*